United States Patent
Tanaka et al.

(10) Patent No.: US 10,254,576 B2
(45) Date of Patent: Apr. 9, 2019

(54) LIGHT CONTROL DEVICE AND METHOD FOR MANUFACTURING THE SAME

(71) Applicant: SEIKO ELECTRIC CO., LTD., Fukuoka (JP)

(72) Inventors: Masamitsu Tanaka, Fukuoka (JP); Kazutoshi Yoshida, Fukuoka (JP); Nobutake Konishi, Fukuoka (JP)

(73) Assignee: SEIKO ELECTRIC CO., LTD., Fukuoka (JP)

( * ) Notice: Subject to any disclaimer, the term of this patent is extended or adjusted under 35 U.S.C. 154(b) by 0 days.

(21) Appl. No.: 15/515,987

(22) PCT Filed: Jul. 1, 2015

(86) PCT No.: PCT/JP2015/069053
§ 371 (c)(1),
(2) Date: Mar. 30, 2017

(87) PCT Pub. No.: WO2016/051894
PCT Pub. Date: Apr. 7, 2016

(65) Prior Publication Data
US 2017/0307915 A1    Oct. 26, 2017

(30) Foreign Application Priority Data
Sep. 30, 2014    (JP) .................. 2014-200687

(51) Int. Cl.
| | | |
|---|---|---|
| *G02F 1/1334* | (2006.01) | |
| *C09K 19/38* | (2006.01) | |
| *C08F 222/10* | (2006.01) | |
| *C09K 19/54* | (2006.01) | |
| *C09K 19/30* | (2006.01) | |
| *C09K 19/12* | (2006.01) | |

(52) U.S. Cl.
CPC ...... *G02F 1/1334* (2013.01); *C08F 222/1006* (2013.01); *C09K 19/3068* (2013.01); *C09K 19/38* (2013.01); *C09K 19/544* (2013.01); *C08F 2222/1013* (2013.01); *C09K 2019/122* (2013.01); *C09K 2019/123* (2013.01); *C09K 2019/3016* (2013.01); *C09K 2019/3075* (2013.01); *G02F 2202/022* (2013.01); *G02F 2202/28* (2013.01)

(58) Field of Classification Search
CPC .. C09K 19/38; C09K 19/544; C09K 19/3068; C09K 2019/122; C09K 2019/123; C09K 2019/3016; C09K 2019/3075; G02F 1/1333; G02F 1/1334; G02F 2202/022; G02F 2202/28; C08F 222/1006; C08F 2222/1013
USPC ................................... 252/299.01
See application file for complete search history.

(56) References Cited

U.S. PATENT DOCUMENTS

| | | | |
|---|---|---|---|
| 4,435,407 A | 3/1984 | Walker | |
| 2003/0043334 A1 | 3/2003 | Sato et al. | |
| 2008/0094551 A1 | 4/2008 | Hayashi et al. | |

FOREIGN PATENT DOCUMENTS

| | | |
|---|---|---|
| CN | 101007949 A | 8/2007 |
| JP | H02-055318 A | 2/1990 |
| JP | 2003-140183 A | 5/2003 |
| JP | 2003-155388 A | 5/2003 |
| JP | 2008-102341 A | 5/2008 |
| JP | 2008-266633 A | 11/2008 |
| JP | 4630954 B2 | 12/2008 |
| JP | 2014-122262 A | 7/2014 |
| JP | 5386630 B2 | 7/2014 |

OTHER PUBLICATIONS

International Search Report issued in Application No. PCT/JP2015/069053, dated Sep. 15, 2015.

*Primary Examiner* — Geraldina Visconti
(74) *Attorney, Agent, or Firm* — Michael Best & Friedrich LLP

(57) ABSTRACT

There is provided a light control device that solves various practical problems, including the adhesive strength between layers, of a light control device comprising a polymer/liquid crystal composite derived from a polymerizable composition comprising an acrylic monomer and ITO layers. In the light control device, ITO layers are respectively bonded to both surfaces of a polymer/liquid crystal composite material layer in which a liquid crystal material is dispersed in a polymer material obtained by polymerizing an acrylic monomer, an amount of the acrylic monomer is in the range of 30 to 45% by weight based on a total amount of the acrylic monomer and the liquid crystal material, and silane coupling agent layers are respectively interposed between the polymer/liquid crystal composite material layer and the ITO layers.

6 Claims, 5 Drawing Sheets

(a)

(b)

(a)

(b)

LIGHT CONTROL DEVICE AND METHOD FOR MANUFACTURING THE SAME

TECHNICAL FIELD

The present invention relates to a novel light control device preferred for use in window glass, partitions, and the like, and a method for manufacturing the same.

BACKGROUND ART

A light control device comprising a polymer/liquid crystal composite material comprising a polymer material typified by an acrylic acid-based polymer as a matrix with a liquid crystal material dispersed therein does not need a polarizing plate or an oriented film and can switch between a transparent state and an opaque (cloudy) state by turning on/off an electric field, unlike a conventional display comprising a liquid crystal. Therefore, it is possible to provide a light control device having a larger area, and application to building materials such as window glass and partitions is expected. Various polymer/liquid crystal materials that can constitute light control devices have been proposed [for example, Japanese Patent Laid-Open No. 2-55318 (Patent Literature 1), U.S. Pat. No. 4,435,407 (Patent Literature 2), Japanese Patent Laid-Open No. 2003-155388 (Patent Literature 3), and Japanese Patent Laid-Open No. 2008-266633 (Patent Literature 4)].

Japanese Patent No. 4630954 (Patent Literature 5) discloses a polymer/liquid crystal composite material obtained from a polymerizable composition comprising acrylic monomers that are a methacrylate acid ester and an ethoxylated trimethylolpropane triacrylate ester, and a urethane-based diacrylate soft oligomer represented by the formula $R_1—(R_2—R_3)_n=R_2—R_1$, wherein $R_1$ is an acrylic group, $R_2$ is an isocyanate residue, and $R_3$ is a diol group. Patent Literature 5 purports that the polymer/liquid crystal composite material has high viscosity that enables the composite material to form a uniform composite film and high tackiness to a base material and is useful for light control glass.

The polymer/liquid crystal material described in Patent Literature 5 has several practical problems as shown below because it is a liquid crystal material comprising a urethane-based diacrylate soft oligomer.

For example, the tensile modulus of a urethane-based material is 70 to 690 Mpa. Therefore, it can be said that the urethane-based material is softer and more pliable in terms of physical properties than an acrylic material, which has a tensile modulus of 2200 to 3200 Mpa. But such a low tensile modulus is a fatal drawback in a polymer/liquid crystal composite material (polymer/liquid crystal composite film) used for a large light control device and the like, and thus causes local unevenness and partial transparency due to stress and bending. In other words, the polymer is likely to deform due to external stress, and the liquid crystal aligns in a fixed direction following the deformed polymer to thereby locally occur unevenness in which the transmittance changes and transparency.

In addition, it is necessary to remove a polymer during the formation of the electrodes of a light control device. However, when in using the polymer/liquid crystal composite material described in Patent Literature 5, indium tin oxide ("ITO") and the polymer adhere to each other more than necessary at the interface therebetween, and therefore time is required for the cleaning of the ITO surfaces, which is problematic. Further, for the polymer/liquid crystal composite material comprising a urethane-based acrylate and the like as described in Patent Literature 5, it is necessary to increase the cell gap (generally 18μ) in order to sufficiently ensure shielding properties when the electric field is turned off, and as a result, the viewing angle when the electric field is turned on is very poor.

Further, the polymer/liquid crystal composite material comprising a urethane-based acrylate and the like in Patent Literature 5 is very sensitive to UV polymerization temperature during film formation in the step of forming a polymer network by UV polymerization. Therefore, another problem is that unless the temperature control is precise during film formation, the driving characteristics of the resulting light control device vary to thereby provide transparency deterioration when the electric field is turned on and unevenness when the electric field is turned off.

In order to solve above-described various problems of such a polymer/liquid crystal composite material comprising a urethane-based acrylate and the like, including the tensile modulus and the transmittance, the present inventors have been proposed a polymer/liquid crystal composite material comprising an acrylic monomer and the like [for example, Japanese Patent No. 5386630 (Patent Literature 6)].

The polymer/liquid crystal material described in Patent Literature 6 is a new polymer/liquid crystal material, but a problem thereof is that when a light control device is manufactured using it, the adhesive strength between the layer of the liquid crystal material comprising the acrylic monomer and the ITO layer tends to weaken. Therefore, further improvement in the adhesive strength between these layers is desired in order to endure practical use as the light control device.

CITATION LIST

Patent Literature

Patent Literature 1: Japanese Patent Laid-Open No. 2-55318
Patent Literature 2: U.S. Pat. No. 4,435,407
Patent Literature 3: Japanese Patent Laid-Open No. 2003-155388
Patent Literature 4: Japanese Patent Laid-Open No. 2008-266633
Patent Literature 5: Japanese Patent No. 4630954
Patent Literature 6: Japanese Patent No. 5386630

SUMMARY OF INVENTION

Technical Problem

It is an object of the present invention to provide a light control device (light control apparatus) that can solve various practical problems, including the above adhesive strength between layers, of a light control device comprising a polymer/liquid crystal composite derived from a polymerizable composition comprising an acrylic monomer as described in Patent Literature 6 and ITO layers and is preferred for use in window glass, partitions, and the like.

Solution to Problem

The present inventors have paid attention to the possibility that a polymer/liquid crystal composite derived from a polymerizable composition comprising an acrylic monomer form a very hard material compared with a urethane-based acrylate, and attempted to make a light control device in which the content of an acrylic monomer constituting a polymer/liquid crystal composite material is increased.

However, in this light control device, the adhesiveness (tight adherence) has weakened at the interface between the polymer/liquid crystal composite material and the ITO layer, and as a result, the bleeding of the liquid crystal has occurred. Further, the robustness of the light control device has also decreased, and the polymer network has been likely to deform by external physical stress and thermal stress. Thus, it has been found that quality including practically sufficient strength cannot be ensured.

Therefore, the present inventors have studied diligently over and over and as a result found that the above-described problems are solved by blending a polymer obtained from an acrylic monomer in a particular proportion and applying a silane coupling agent to ITO surfaces to obtain a light control device preferred for use in window glass, a partition, or the like.

Thus, the present invention provides a light control device in which ITO layers are respectively bonded to both surfaces of a polymer/liquid crystal composite material layer in which a liquid crystal material is dispersed in a polymer material obtained by polymerizing an acrylic monomer, an amount of the acrylic monomer being in the range of 30 to 45% by weight based on a total amount of the acrylic monomer and the liquid crystal material, and silane coupling agent layers being respectively interposed between the polymer/liquid crystal composite material layer and the ITO layers.

DESCRIPTION OF EMBODIMENTS

Figure 1:
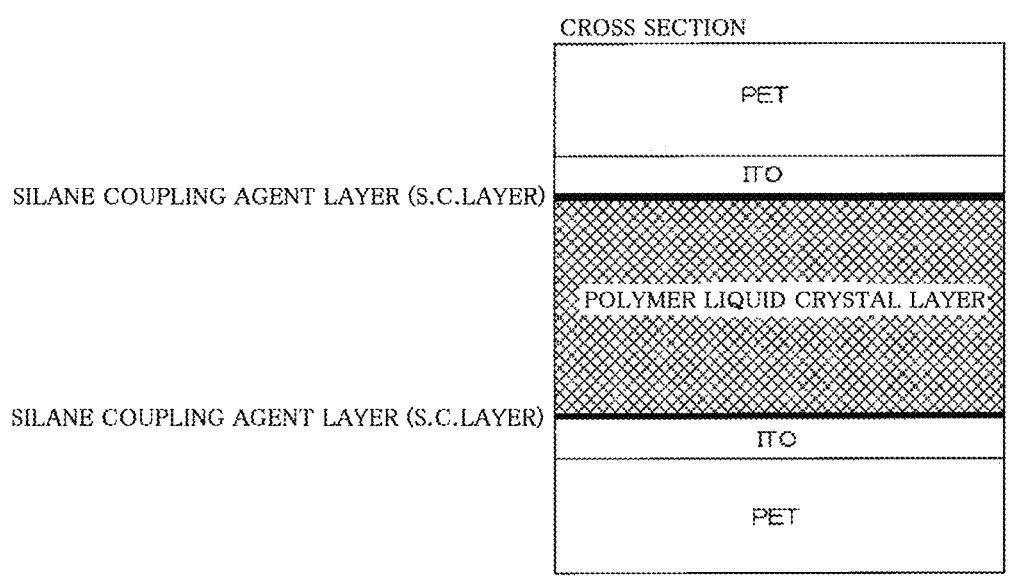
FIG. 1 shows a cross-sectional view showing the outline of a light control device according to the present invention.

An acrylic monomer as a raw material of a polymer/liquid crystal composite material layer constituting the light control device of the present invention is not particularly limited, but preferably comprises two types of acrylic monomers as basic structure materials, and two types of acrylic monomers as additives, as mentioned below.

As the two types of acrylic monomers (hereinafter referred to as a first acrylic monomer and a second acrylic monomer) as basic structure materials in a polymerizable composition for obtaining the light control device of the present invention, various acrylic monomers conventionally known as those that have an acrylic group or a methacrylic group and can form a polymer matrix (crosslinked structure) in which a liquid crystal material is to be dispersed by polymerization can be used.

Examples of two types of acrylic monomers as basic structure materials preferred for use in the present invention include a first acrylic monomer selected from the following formulas (I)-1 to (I)-4 and a second acrylic monomer selected from the following formulas (II)-1 to (II)-4.

[Formula 1]

(I)-1

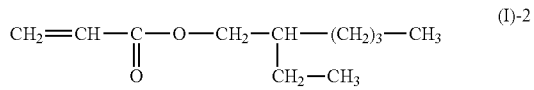
(I)-2

(I)-3

(I)-4

[Formula 2]

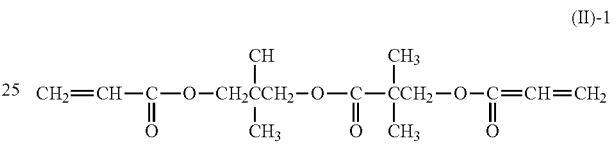
(II)-1

(II)-2

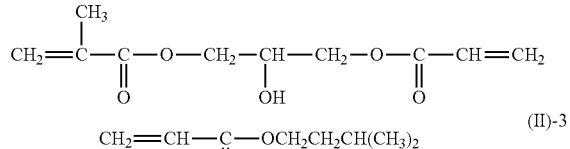
(II)-3

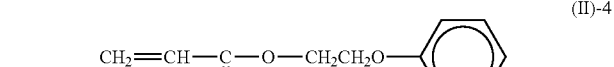
(II)-4

Examples of acrylic monomers as basic structure materials particularly preferred for use in the present invention, among the above, are 3,5,5-trimethylhexyl acrylate (TMHA) represented by the above formula (I)-1 as the first acrylic monomer and an acrylic acid adduct of hydroxypivalic acid neopentyl glycol ester (HDMPDA) represented by the above formula (II)-1 as the second acrylic monomer, and other acrylic compounds can also be used.

Examples of the first acrylic monomer include 2-ethylhexyl acrylate represented by the above formula (I)-2, 2-butoxyethyl acrylate represented by the above formula (I)-3, or 2-hydroxybutyl acrylate represented by the above formula (I)-4.

In addition, examples of the second acrylic monomer include 2-hydroxy-3-acryloyloxypropyl methacrylate represented by the above formula (II)-2, isoamyl acrylate represented by the above formula (II)-3, or phenoxyethyl acrylate represented by the above formula (II)-4.

As the two types of acrylic monomers as the above additives in the polymerizable composition for obtaining the light control device of the present invention, an acrylic monofunctional monomer and an acrylic polyfunctional monomer that are monomers different from the first acrylic monomer and the second acrylic monomer as the above basic structure materials can be used.

The acrylic monofunctional monomer used as the above additive is a compound comprising a molecular structure having one acrylic group or methacrylic group.

An acrylic monofunctional monomer preferred for use in the present invention is, but not limited to, methyl methacrylate or methyl acrylate for reasons of easy availability and operability and the like, and particularly preferred one is methyl methacrylate. For example, acrylic monofunctional monomers such as ethyl acrylate, propyl acrylate, butyl acrylate, 2-ethylhexyl acrylate, dodecyl acrylate, stearyl acrylate, ethyl methacrylate, propyl methacrylate, butyl methacrylate, and 2-ethylhexyl methacrylate can also be similarly used.

The acrylic polyfunctional monomer used as the additive in the polymerizable composition for the polymer/liquid crystal composite material for obtaining the light control device of the present invention is a compound comprising a molecular structure having two or more acrylic groups or methacrylic groups. Examples of an acrylic polyfunctional monomer preferred for use in the present invention include, but are not limited to, ethoxylated trimethylolpropane triacrylate, ethoxylated pentaerythritol tetraacrylate, and ethoxylated glycerin acrylate (all being trifunctional) for reasons of easy availability and operability and the like.

In addition to these, for example, many trifunctional acrylates including trimethylolpropane triacrylate, pentaerythritol triacrylate, and propoxylated trimethylolpropane triacrylate can also be similarly used.

The acrylic monofunctional monomer and the acrylic polyfunctional monomer in the above additives are preferably blended at the ratio of 1:2 to 2:1 and used.

The silane coupling agent used in the present invention is not particularly limited, but in terms of the reliability of application to an indium tin oxide (hereinafter "ITO") surface, those containing an amino group are preferably used. Examples of such silane coupling agents include 3-aminopropyltriethoxysilane. In addition to this, those containing an amino group such as 3-aminopropyltrimethoxysilane, 3-(2-aminoethyl)aminopropyltrimethoxysilane, 3-(2-aminoethyl)aminopropyltrimethoxysilane, 3-phenylaminopropyltrimethoxysilane, and [a 40% solution of 1,2-ethanediamine, N-{3-(trimethoxysilyl)propyl}-, N-{(ethenylphenyl)methyl} derivatives-hydrochlorides in methanol] can also be used.

In order to obtain sufficient peel strength, the silane coupling agent is preferably added in an amount of 0.5% by weight or more, and more preferably 0.5 to 2.0% by weight.

As the application liquid of the silane coupling agent, a liquid obtained by adding the silane coupling agent to a mixed liquid of pure water and ethanol can be used. For example, a liquid obtained by adding 0.5 to 2.0% by weight (for example, 1% by weight) of the silane coupling agent as described above to pure a mixed liquid at water:ethanol=1:9 can be used. In addition to this, a silane coupling agent solution obtained by adding the silane coupling agent to 100% of ethanol may be used. The viscosity of the application liquid of the silane coupling agent is not particularly limited, and, for example, the viscosity can be 1.5 cP at 20° C.

In addition, the application liquid of the silane coupling agent is preferably applied to a surface of an ITO layer to 0.5 µm or more in view of obtaining sufficient adhesive strength, more preferably applied to 5 µm or more in view of ensuring the uniformity of adhesive strength, and, for example, to 10 µm. In addition, the application liquid of the silane coupling agent applied on the ITO surface is preferably dried at ordinary temperature for 5 minutes or more in order to be reliably applied.

The method for applying the silane coupling agent and the polymerizable component on the ITO surface is not particularly limited, and known various methods can be used. Examples thereof include gravure rolls, bar coaters, nozzle spray, curtain spray, curtain coaters, inkjet, and nozzle dispensers.

The light control device of the present invention can be manufactured by a method comprising the steps of applying a silane coupling agent to a surface of an ITO layer; and applying to the obtained silane coupling agent layer a polymerizable composition containing an acrylic monomer of a first acrylic monomer and a second acrylic monomer as basic structure materials, and an acrylic monofunctional monomer and an acrylic polyfunctional monomer as additives, a polymerization initiator, and a liquid crystal material, and polymerizing the polymerizable composition. In the above application step, the silane coupling agent is applied to the surface of the ITO layer without being previously mixed into a liquid crystal monomer (the polymerizable composition containing the liquid crystal material). By this application method, the excellent effect of significantly improving the strength of the light control device is exhibited.

The polymerization in the polymerization step can be thermal polymerization but is generally performed by photopolymerization (ultraviolet irradiation). As the polymerization initiator, various photopolymerization initiators selected from conventionally known acetophenones, benzophenones, benzoins, benzils, Michler's ketones, benzoin alkyl ethers, benzil dimethyl ketals, thioxanthones, or the like can be used. Examples of a polymerization initiator preferred for use in the present invention include, but are not limited to, 2,2-dimethoxy-2-phenylacetophenone (DMAP).

For the polymerizable composition containing the liquid crystal material, the type of the liquid crystal material is not particularly limited in the light control device of the present invention, and the principle of the present invention can be applied to any type of liquid crystal, for example, a nematic liquid crystal, a smectic liquid crystal, or a discotic liquid crystal. An example of a preferred liquid crystal to which the present invention is applied is a nematic liquid crystal but is not limited to this. For the purpose of modifying the characteristics of the device, or the like, two or more types of liquid crystal compounds can also be used.

In addition, from the viewpoint of increasing peel strength in the light control device of the present invention, after the above polymerization step, heating is performed at a temperature of 80 to 120° C. preferably, and, for example, heating can be performed at 100° C. for 1 hour. When the temperature is higher than 120° C., it exceeds the heat resistance limit of the resin (PET or the like) outside the ITO layer, and therefore the temperature is preferably 120° C. or less.

When the light control device of the present invention is manufactured, the amount the above acrylic monomer is in the range of 30 to 45% by weight as described above, more preferably in the range of 35 to 45% by weight, and, for example, 40% by weight, based on the total amount of the liquid crystal material and the above acrylic monomer.

In this context, the amount of the liquid crystal material is smaller than in the cases of the above-described Patent Literature 5 and Patent Literature 6, and it is considered that because of such a smaller amount, the polymer appropriately adheres to the ITO interface (see Examples described later).

In addition, when the polymer/liquid crystal composite material constituting the light control device of the present invention is manufactured, the additive, which is constituted of a mixture of the acrylic monofunctional monomer and the acrylic polyfunctional monomer, is preferably added in an amount of 1 to 10% by weight based on the above basic structure materials, and particularly preferably added in an amount of 2 to 6% by weight in view of driving characteristics as the light control device (see Examples described later).

Thus, according to the present invention, there is provided a light control device in which the above-described polymer/liquid crystal composite material is sandwiched between a pair of substrates on which electrodes (ITO electrodes) are formed, as shown in FIG. 1, that is, an apparatus that can switch between a transparent state and an opaque (cloudy) state by turning on/off electric field application.

The light control device according to the present invention has many features and advantages as described below.

(1) The polymer is composed only of an acrylic material having a high tensile modulus, and therefore transparency due to stress and unevenness, which are problems in building material applications such as light control window glass and partitions, do not occur (that is, the light control device is not transparent even if it is bent, and there is no unevenness in a laminated glass product).

(2) For a light control device, a turbidity of 89% or more is needed in order to sufficiently ensure shielding properties when the electric field is turned off. In a case where the material of Patent Literature 5 is used with a cell gap of 10μ, only a turbidity of 87% is obtained when the electric field is turned off, and shielding properties when the electric field is turned off cannot be sufficiently ensured. However, according to the present invention, the cell gap can be extremely decreased due to the effect of the silane coupling agent to improve the driving characteristics significantly, and moreover, even with a cell gap of 10μ, the turbidity when the electric field is turned off is 89% or more. In addition, thinning the cell gap enables lowering the voltage during driving and improvement of the viewing angle.

(3) In the light control device of the present invention using the silane coupling agent, the adhesive strength (close adhesion strength) to the ITO interface improves, and is far higher than in that using no silane coupling agent.

(4) In addition, in the light control device of the present invention, the device characteristics are insensitive to UV polymerization temperature during film formation, and therefore manufacturing conditions such as temperature control can be relaxed.

(5) Further, in the light control device of the present invention, since deterioration proceeds extremely gradually and uniformly, the weather resistance thereof is excellent, and the appearance is not impaired over time: the shielding properties are maintained even in long ultraviolet irradiation.

(6) In addition, in Patent Literature 6, when the proportion of the acrylic polymer is simply increased (increase from 20% to 40%), not only does the adhesive strength to the ITO surface not improve significantly (change in adhesive strength at a peel speed of 0.2 mm/s: from 0.5 N/30 mm to 0.8 N/30 mm), but even liquid crystal bleeding on the ITO surface occurs. But, in the light control device of the present invention, even in a case where the proportion of the acrylic polymer is higher than in Patent Literature 6 (40%), mainly by the contribution of the silane coupling agent, higher adhesive strength is shown (adhesive strength at a peel speed of 0.2 mm/s: 4.4 N/30 mm), and liquid crystal bleeding on the ITO surface is suppressed.

(7) In addition, in the light control device of the present invention, the film does not peel, and therefore the light control device can be cut by a cutting tool or the like.

In order to more specifically clarify the features of the present invention, the present invention will be described below by way of Examples, but the present invention is not limited by these Examples.

Figure 2:
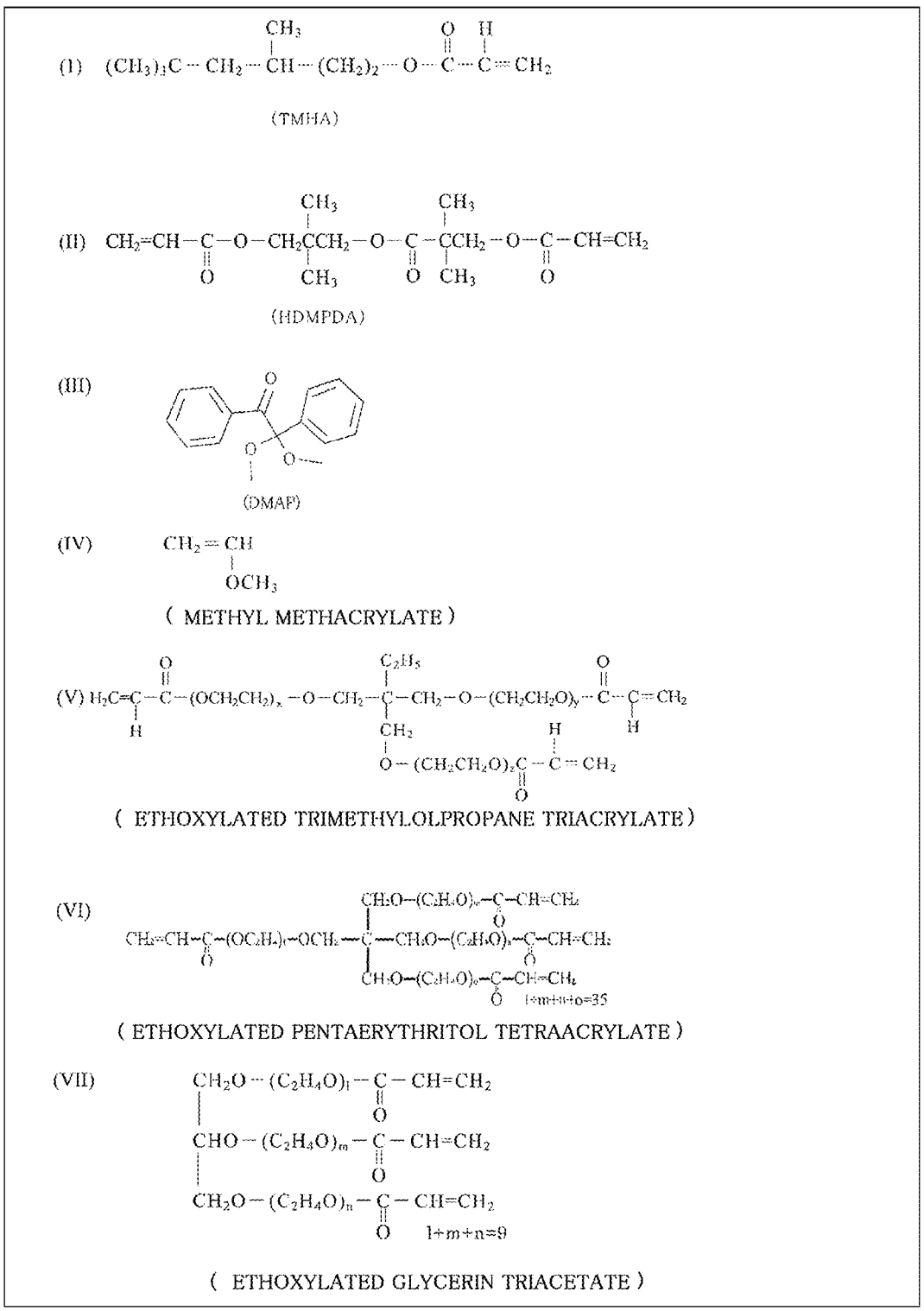
FIG. 2 shows the chemical structural formulas of compounds used in the Examples of the present invention.

The chemical structural formulas of compounds used in the following Examples are shown in FIG. 2.

The liquid crystal used (LC425011) is a cyanobiphenyl-based nematic liquid crystal manufactured by LCC Co, Ltd and has structures shown in the following table 1.

TABLE 1

| Structure of liquid crystal | Content |
|---|---|
| 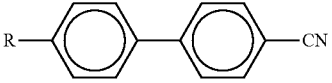 | 26.8 |
| 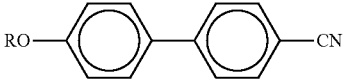 | 29.4 |
| 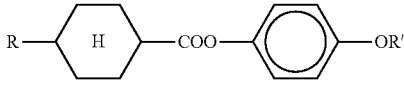 | 12.5 |
|  | 6.3 |
| 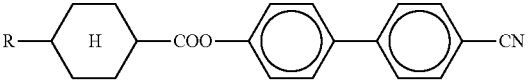 | 12.5 |

TABLE 1-continued

| Structure of liquid crystal | Content |
|---|---|
|  | 12.5 |
| Total | 100 |

In addition, the experimental methods are roughly as follows.

V-H (Applied Voltage-Turbidity) Test:

Electrodes were formed on the upper and lower ITO surfaces of a 60×40 mm size test piece, and the turbidity (%) when an arbitrary voltage was applied was measured by a haze meter (NDH5000) manufactured by Nippon Denshoku Industries Co., Ltd.

Close Adhesion Strength Measurement Test:

A 30×35 mm size test piece was fixed to the stage of a push-pull gauge PSM-50N manufactured by IMADA Co., Ltd., and a 90° peel test was performed.

Example 1

Effect of Adding Various Polyfunctional Monomers

To a base liquid crystal material having a blending ratio shown in Table 2, a 1:1 mixture of A (monofunctional monomer) and B (polyfunctional monomer) as an additive was added in an amount of 5% by weight based on basic structure materials (TMHA+HDMPDA), to manufacture (film-form) a polymer/liquid crystal composite structure. The V-H test was performed with A (monofunctional monomer) being methyl methacrylate (MMA) and ethoxylated trimethylolpropane triacrylate used as B (polyfunctional monomer). The film formation conditions were as follows: a cell gap (10μ), UV (ultraviolet) irradiation (40 mW×48 s), and UV polymerization temperature (26.0° C.)

TABLE 2

| | | | Acrylic monomers | | |
|---|---|---|---|---|---|
| | Liquid crystal | Basic structure materials | | | Acceleration of UV polymerization |
| Material | LC425011 | TMHA | HDMPDA | MMA | Ethoxylated trimethylolpropane triacrylate | Initiator |
| 1 | 60% | 10% | 30% | — | — | 1% |
| 2 | 60% | 8% | 24% | 4% | 4% | 1% |
| 3 | 60% | 10% | 22% | 4% | 4% | 1% |
| 4 | 70% | 10% | 12% | 4% | 4% | 1% |
| 5 | 50% | 10% | 32% | 4% | 4% | 1% |

Figure 3:
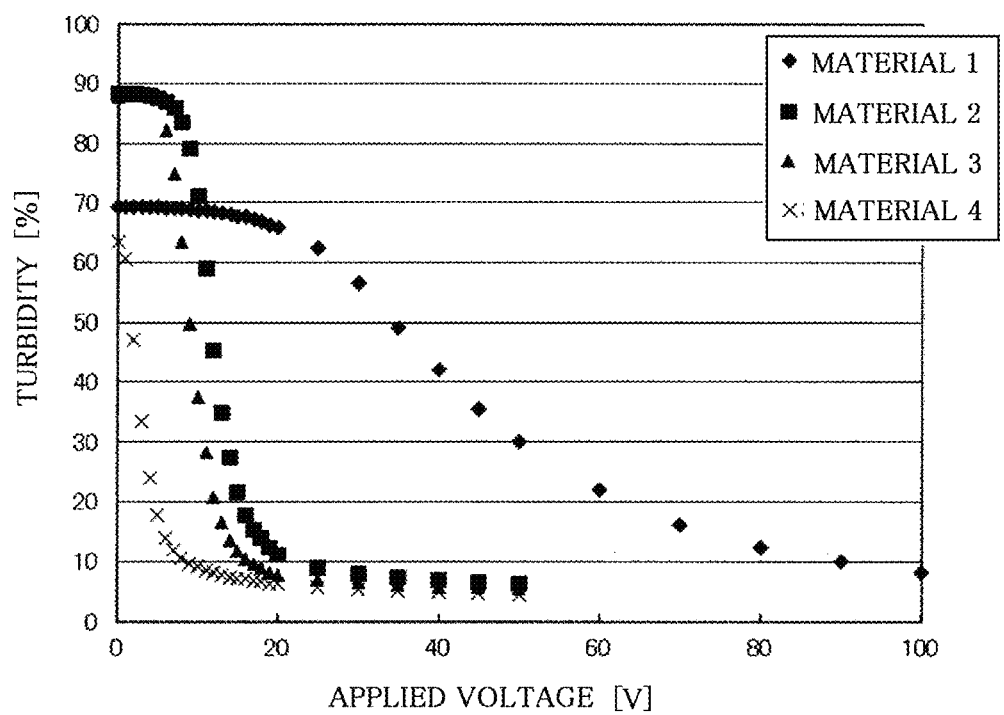
FIG. 3 shows the results of a V-H (applied voltage-turbidity) test for the materials 1 to 5 of the present invention for which a silane coupling agent was not added.

The results of the V-H test are shown in FIG. 3. The above material 1 is a light control device comprising a polymer/liquid crystal composite material in the form of a film without the additive comprising the mixture of the monofunctional monomer and the polyfunctional monomer and is shown for comparison.

As shown in FIG. 3, by increasing the proportion of the additive, the V-H characteristics improve significantly, and the driving voltage for obtaining the same turbidity decreases greatly. In addition, in the material 4 (liquid crystal 70%), the dissolution limit of the acrylic monomers in the liquid crystal was shown.

In addition, for the material 5, liquid crystal bleeding trouble occurred immediately after film formation, and therefore measurement was impossible. From this, it was confirmed that the content of the liquid crystal was preferably in the range of 55% to 70%. Using mainly the material 3 and the material 4, which are samples having excellent V-H characteristics among these, further tests were performed in detail below.

Figure 4:
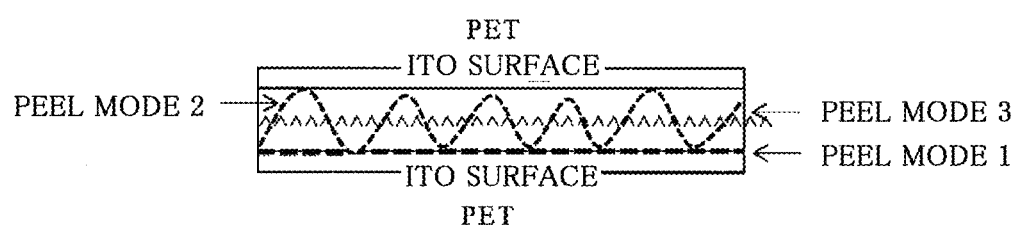
FIG. 4 schematically shows peel modes in tight adherence to ITO interfaces.

FIG. 4 schematically shows peel modes in tight adherence to ITO surface. The peel mode 1, which occurs when the adhesiveness between the ITO surface and the polymer liquid crystal film is insufficient, is the most unsuitable form for the principle of operation of the present device, and as the peel mode in the present device, the mode 2 or the mode 3 is desired.

Addition of Silane Coupling Agent

For the light control devices of the present invention obtained by using a silane coupling agent (hereinafter also abbreviated as S.C.) with the materials 3 to 5, which were samples having excellent V-H characteristics from the above results, their detailed characteristics were checked. As the silane coupling agent, 3-aminopropyltriethoxysilane having an amino functional group (Z6011, manufactured by Dow Corning Toray Co., Ltd.) was used. As the application liquid of the silane coupling agent, a liquid (viscosity: 1.5 cP (20° C.)) obtained by adding 1 wt % of the silane coupling agent, 3-aminopropyltriethoxysilane, to a mixed liquid of pure water 1+ethanol 9 was used. The amount of the silane coupling agent added was 1.0% by weight, and the silane coupling agent solution was applied to each of the upper and lower ITO surfaces to a thickness of 10 μm.

First, the bleeding of the liquid crystal on the ITO surfaces was checked, and the bleeding of the liquid crystal did not occur as shown in the following table.

TABLE 3

| | Liquid crystal bleeding |
|---|---|
| Material3 + S.C | No |
| Material4 + S.C | No |
| Material5 + S.C | No |

Comparative Examples

On the other hand, when the silane coupling agent was not added, the bleeding of the liquid crystal occurred for all materials other than the material 4 as shown in the following table.

TABLE 4

|  | Liquid crystal bleeding |
|---|---|
| Material 1 | Yes |
| Material 2 | Yes |
| Material 3 | Yes |
| Material 4 | No |
| Material 5 | Yes |

In addition, as for the content of the liquid crystal, 70% in the material 4 was the dissolution limit, in terms of the solubility of the acrylic monomers in the liquid crystal.

Comparative Example

A silane coupling agent was previously mixed into a liquid crystal monomer, and a light control device was made under the following making conditions.
(Making Conditions)
Gap: 12µ
UV illuminance: 40 mW/cm²
Cumulative radiation: 1920 mJ
Temperature during UV curing: 26.0±0.3° C.

Results regarding the obtained adhesive strength are shown below. As shown in the following results, liquid crystal bleeding trouble occurred, and a practical level could not be reached. In addition, the peel strength decreased, and the peel strength was inferior to that without addition even if heating was performed. Further, by previously adding the silane coupling agent, the shielding properties when the electric field was turned off also decreased.

TABLE 5

| Silane coupling agent | Amount added to liquid crystal monomer | Liquid crystal bleeding trouble | Adhesive strength(N/30 mm) | |
|---|---|---|---|---|
| | | | Until peeling starts | Peeled to length of 20 mm |
| | | | Peel speed | |
| | | | 0.2 mm/sec | 5 mm/sec |
| Not added | — | Yes | 0.75 | 3.5 |
| Having amino functional group | 5% | Yes | 0.25 | 1.5 |

Figure 5:
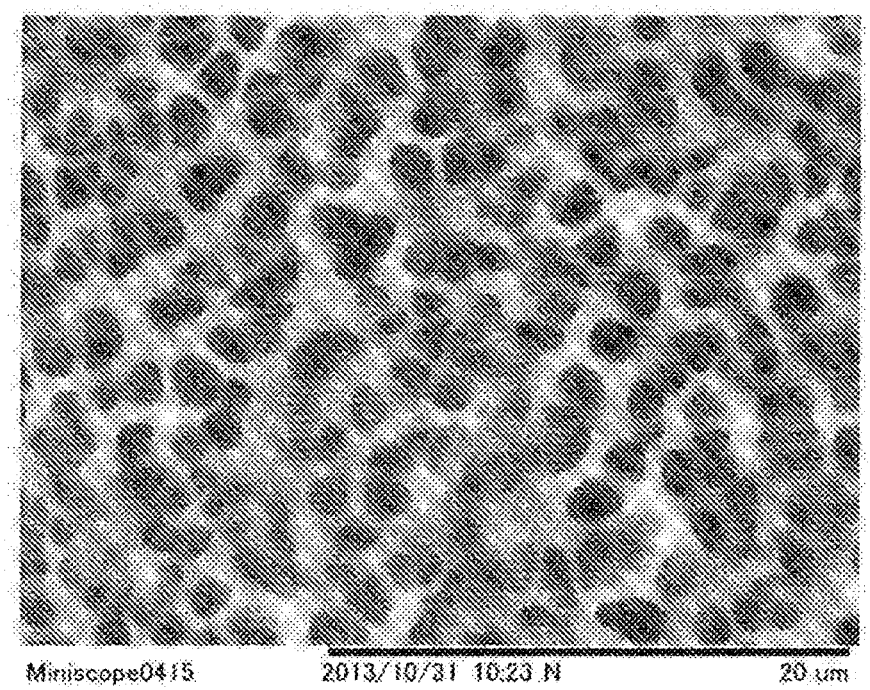
FIG. 5 shows electron micrographs for observing the domain size of a light control device according to the present invention.
Figure 5:
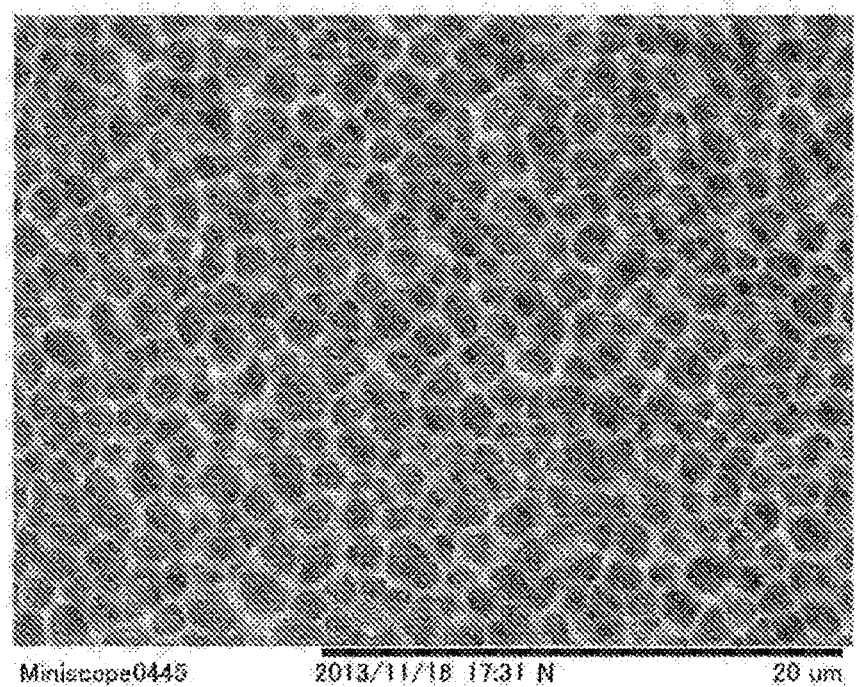

FIG. 5 shows electron microscope (SEM) photographs in which the domain sizes of film-formed articles obtained as described above are observed. The upper row (a) shows the case of a light control device according to the present invention in which the formation of silane coupling layers on ITO surfaces and the material 3 are combined. The lower row (b) shows the case of a light control device according to Patent Literature 6. It was confirmed that by an increase in the content of the acrylic polymer, the network trunks become thicker (about 4 times), and that a structure in which transparency due to stress, i.e., the physical stress of the polymer network was even less likely to occur was thus provided.

Comparison of Peel Strength (Before and after Heating) of Various Liquid Crystal Films The results are shown below for comparing the peel strength of respective liquid crystal films constituting a light control device obtained from the material 3 of the present invention and a light control device obtained from Patent Literature 6 according to the above manufacturing method, with and without heating (at 100° C. for 1 hour) and with and without a silane coupling agent.

TABLE 6

| | Material 4 | | | | Material 5 | | |
|---|---|---|---|---|---|---|---|
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 0.2 | 1.5 | 1 | Before | Impossible to measure(<0.1) | 0.1 | 1 |
| After | 0.2 | 1.6 | 1 | After | Impossible to measure(<0.1) | 0.1 | 1 |
| | Material 4 + S.C. | | | | Material 5 + S.C. | | |
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 0.8 | 2.8 | 1 | Before | 1.8 | 6.2 | 1 |
| After | 0.8 | 3.2 | 2 or 3(2 is dominant) | After | 4.8 | 9.0 | 3 |

| | Patent Literature 6 | | | | Material 3 | | |
|---|---|---|---|---|---|---|---|
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 0.5 | 3.2 | 1 or 2 | Before | 0.8 | 3.4 | 1 |
| After | 0.5 | 4.4 | 1 or 2 | After | 0.8 | 4.2 | 1 |
| | Patent Literature 6 + S.C. | | | | Material 3 + S.C. | | |
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 1.4 | 4.4 | 2 or 3 (3 is dominant) | Before | 1.9 | 7.6 | 1 |
| After | 1.5 | 4.4 | 2 or 3 (3 is dominant) | After | 4.4 | 10.5 | 2 or 3 (3 is dominant) |

As seen in the obtained results, in the light control device obtained from the material 3 of the present invention, the adhesive strength at a peel speed of 0.2 mm/s reached 1.9 N/30 mm without heating, and further, a strength of 4.4 N/30 mm was shown after heating.

On the other hand, in the light control device obtained from Patent Literature 6, the adhesive strength at a peel speed of 0.2 mm/s was only 0.5 N/30 mm, and there was no change before and after heating. Also when the silane coupling agent was added to the light control device obtained from Patent Literature 6, the adhesive strength under the same condition was only 1.4 N/30 mm. In addition, also in a light control device obtained when the ratio of the acrylic polymer of Patent Literature 6 (20%) was increased to 40% (material 3), the adhesive strength was only 0.8 N/30 mm.

Further, in addition to the light control device obtained from the material 3 according to the present invention described above, light control devices comprising the material 4 and the material 5 were made in the same manner as for the above using, as the application liquid of the silane coupling agent, a liquid (viscosity: 1.5 cP (20° C.)) obtained by adding 1 wt % of the silane coupling agent, 3-aminopropyltriethoxysilane, to a mixed liquid of pure water 1+ethanol 9. The amount of the silane coupling agent added was 1.0% by weight, and the silane coupling agent solution was applied to each of the upper and lower ITO surfaces to a thickness of 10 µm. The peel strength of the liquid crystal film was measured in the same manner as in the above, and the following results were obtained.

TABLE 7

| | Material 4 | | | | Material 5 | | |
|---|---|---|---|---|---|---|---|
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 0.2 | 1.5 | 1 | Before | Impossible to measure(<0.1) | 0.1 | 1 |
| After | 0.2 | 1.6 | 1 | After | Impossible to measure(<0.1) | 0.1 | 1 |
| | Material 4 + S.C. | | | | Material 5 + S.C. | | |
| | Peel strength (N/30 mm) | | | | Peel strength (N/30 mm) | | |
| | Until peeling starts | Peeled to length of 20 mm | | | Until peeling starts | Peeled to length of 20 mm | |
| | Peel speed | | | | Peel speed | | |
| Heating | 0.2 mm/sec | 5 mm/sec | Peel mode | Heating | 0.2 mm/sec | 5 mm/sec | Peel mode |
| Before | 0.8 | 2.8 | 1 | Before | 1.8 | 6.2 | 1 |
| After | 0.8 | 3.2 | 2 or 3(2 is dominant) | After | 4.8 | 9.0 | 3 |

From the obtained results, it was clear that the light control devices obtained from the material 4 and the material 5 of the present invention exhibited far higher adhesive strength than those obtained when the silane coupling agent was not added.

Mechanical Strength of Various Liquid Crystal Glasses

As for a light control device obtained from the material 3 of the present invention according to the above manufacturing method (material 3+S.C.), and light control devices obtained from Patent Literature 5 (Japanese Patent No. 4630954) and Patent Literature 6 (Japanese Patent No. 5386630) according to the above manufacturing method, the liquid crystal sheet was glass-laminated, and the mechanical strength of each liquid crystal glass was measured under the following conditions.

(Conditions)
Liquid crystal film: large film-formed article
Glass lamination: 5 mm-thick glass was laminated, and a load was applied to an expanded polystyrene of 15 cm square on a central portion of 600 mm square. (The load was increased.)
Time: 1 day
Fixing frame two sides The obtained measurement results are shown below.

TABLE 8

| | Load [kg] | | | | | | | | | | |
|---|---|---|---|---|---|---|---|---|---|---|---|
| | 5 | 10 | 15 | 20 | 25 | 30 | 40 | 50 | 60 | 70 | 80 |
| U.S. Pat. No. 5,386,630 | ○ | ○ | ○ | x | — | — | — | — | — | — | — |
| U.S. Pat. No. 4,630,954 | — | — | — | — | — | — | — | — | ○ | — | ○ |
| Material 3 + S.C. | — | — | — | — | — | ○ | ○ | ○ | ○ | ○ | ○ |
| U.S. Pat. No. 5,386,630 + S.C. | — | — | — | — | — | ○ | ○ | ○ | ○ | ○ | ○ |

As clear from the obtained results, the liquid crystal film of Patent Literature 6 (Japanese Patent No. 5386630) peeled under a load of 20 kg. On the other hand, for Patent Literature 5 (Japanese Patent No. 4630954), the present invention (material 3+S.C.), and Patent Literature 6 (Japanese Patent No. 5386630)+S.C., the liquid crystal film did not peel even under a load of 80 kg, but for transparency due to stress at 80 kg, the relationship of Patent Literature 5 (fully transparent)<Patent Literature 6+S.C. (partially transparent)<<the present invention (not transparent at all) was formed.

Relationship Between Liquid Crystal Film Temperature and Peel Strength

Figure 6:
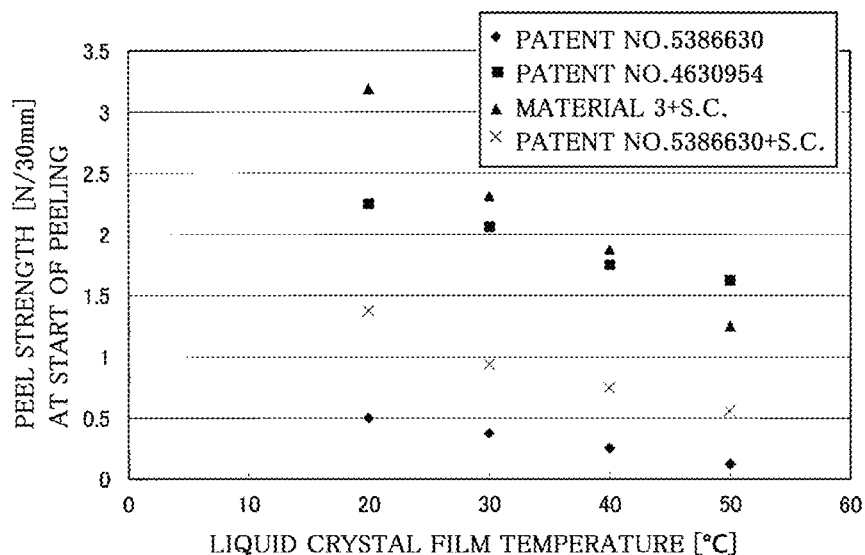
FIG. 6 shows the peel strength of a light control device according to the present invention at each liquid crystal film temperature (° C.).
Figure 6:
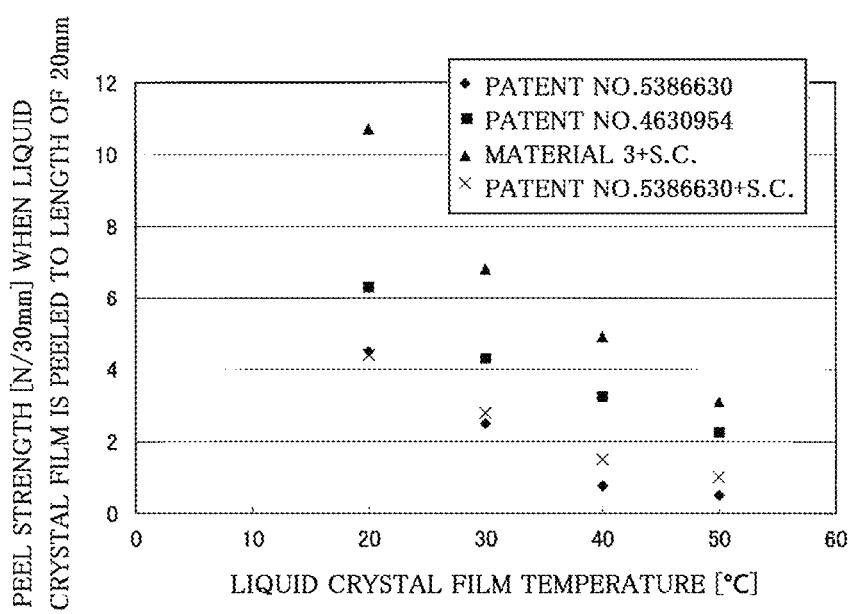

In each light control device similar to the above, the peel strength of each liquid crystal film at each temperature (° C.) was obtained. FIG. 6(a) shows peel strength [N/30 mm] at the start of peeling, and FIG. 6(b) shows results obtained for peel strength [N/30 mm] when the liquid crystal film is peeled to a length of 20 mm. From the obtained results, it was confirmed that the light control device obtained from the material 3 of the present invention (material 3+S.C.) stably exhibited high peel strength regardless of temperature.

Influence of Temperature

Light control devices comprising the material 3 of the present invention (material 3+S.C.) were obtained according to the above manufacturing method with heating at various temperature, followed by cooling to ordinary temperature, and then peel strength measurement thereof was measured at ordinary temperature.

TABLE 9

| | Material 3 + S.C. | | |
|---|---|---|---|
| | Peel strength (N/30 mm) | | |
| | Until peeling starts | Peeled to length of 20 mm | |
| Heat treatment temperature | Peel speed | | |
| | 0.2 mm/sec | 5 mm/sec | Peel mode |
| No heating | 1.9 | 7.6 | 1 |
| 60° C. | 2.8 | 9.5 | 1 or 2 (1 is dominant) |
| 80° C. | 3.8 | 10.2 | 2 or 3 (3 is dominant) |
| 100° C. | 4.4 | 10.6 | 2 or 3 (3 is dominant) |
| 120° C. | 4.5 | 10.0 | 2 or 3 (3 is dominant) |

For the conventional material, the peel strength did not change even if heating was performed as described above, but regarding the light control devices of the present invention, it was confirmed from the above obtained results that the peel strength certainly improved when heating was performed, and that the heating temperature was preferably 80° C. to 120° C.

The invention claimed is:

1. A light control device comprising:
a polymer/liquid crystal composite material layer in which a liquid crystal material is dispersed in a polymer material obtained by polymerizing an acrylic monomer material;
a first ITO layer bonded to a first surface of the polymer/liquid crystal composite material layer with a first silane coupling agent layer interposed therebetween; and
a second ITO layer bonded to a second surface of the polymer/liquid crystal composite material layer with a second silane coupling agent layer interposed therebetween,
wherein an amount of the acrylic monomer material is in the range of 30 to 45% by weight based on a total amount of the acrylic monomer material and the liquid crystal material, and the first and second silane coupling agent layers, and
wherein the acrylic monomer material comprises:
a first basic structure material being a first acrylic monomer selected from the following formulas (I)-1 to (I)-4,
a second basic structure material being a second acrylic monomer selected from the following formulas (II)-1 to (II)-4,
a first additive being an acrylic monofunctional monomer different from the first acrylic monomer and the second acrylic monomer, and
a second additive being an acrylic polyfunctional monomer different from the first acrylic monomer and the second acrylic monomer

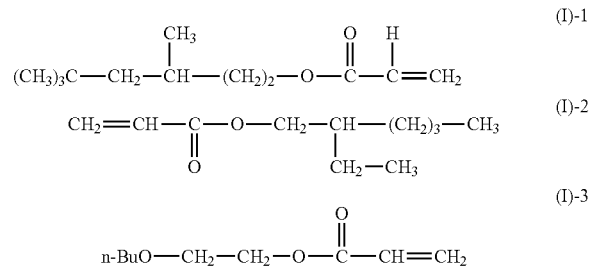

-continued

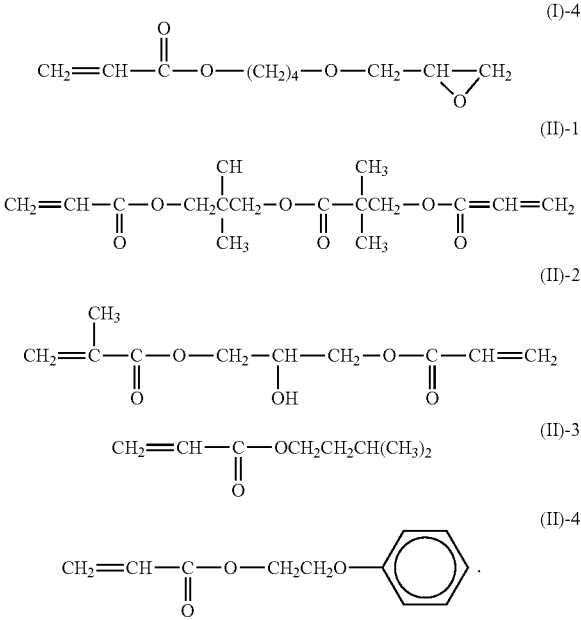

2. The light control device according to claim 1, wherein the first basic structure material is represented by the formula (I)-1, and the second basic structure material is represented by the formula (II)-1.

3. The light control device according to claim 1, wherein the first additive is methyl methacrylate or methyl acrylate, and the second additive is ethoxylated trimethylolpropane triacrylate, ethoxylated pentaerythritol tetraacrylate, or ethoxylated glycerin acrylate.

4. The light control device according to claim 3, wherein the first and second silane coupling agent layers include a silane coupling agent, and the silane coupling agent contains an amino group.

5. A method for manufacturing the light control device according to claim 1, comprising:
applying, a silane coupling agent to a surface of the first ITO layer so as to obtain the first silane coupling agent layer;
applying polymerizable composition to the first silane coupling agent layer, the polymerizable composition containing the acrylic monomer material, a polymerization initiator, and the liquid crystal material, and
polymerizing the polymerizable composition.

6. The method according to claim 5, comprising performing heating at a temperature of 80 to 120° C. after the polymerizing.

* * * * *